(12) United States Patent
Hirai et al.

(10) Patent No.: US 7,096,983 B2
(45) Date of Patent: Aug. 29, 2006

(54) BIPED ROBOT

(75) Inventors: Kazuo Hirai, Yokohama (JP); Kenji Morii, Wako (JP); Masato Hirose, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 74 days.

(21) Appl. No.: 10/416,847

(22) PCT Filed: Nov. 16, 2001

(86) PCT No.: PCT/JP01/10028

§ 371 (c)(1),
(2), (4) Date: May 16, 2003

(87) PCT Pub. No.: WO02/40226

PCT Pub. Date: May 23, 2002

(65) Prior Publication Data

US 2004/0030455 A1    Feb. 12, 2004

(30) Foreign Application Priority Data

Nov. 17, 2000   (JP) .............................. 2000-391636

(51) Int. Cl.
    *B62D 51/06*   (2006.01)
(52) U.S. Cl. ....................... 180/8.1; 700/259
(58) Field of Classification Search ................ 180/8.1, 180/8.6; 700/255, 259
    See application file for complete search history.

(56) References Cited

U.S. PATENT DOCUMENTS

| | | | | |
|---|---|---|---|---|
| 1,800,874 A | * | 4/1931 | Savage | 446/355 |
| 4,046,262 A | * | 9/1977 | Vykukal et al. | 414/5 |
| 4,641,251 A | * | 2/1987 | Inoue | 700/52 |
| 4,683,773 A | * | 8/1987 | Diamond | 74/490.04 |
| 4,738,583 A | * | 4/1988 | Macconochie et al. | 414/735 |
| 4,818,858 A | * | 4/1989 | Sorimachi et al. | 250/203.2 |
| 4,835,450 A | * | 5/1989 | Suzuki | 318/568.13 |
| 5,142,803 A | * | 9/1992 | Lang | 40/411 |
| 5,241,875 A | * | 9/1993 | Kochanneck | 74/490.03 |
| 5,570,992 A | * | 11/1996 | Lemelson | 414/744.3 |
| 5,739,655 A | * | 4/1998 | Torii et al. | 318/568.12 |
| 5,841,258 A | * | 11/1998 | Takenaka | 318/568.12 |
| 6,198,247 B1 | * | 3/2001 | Barr | 318/568.1 |
| 6,317,652 B1 | * | 11/2001 | Osada | 700/245 |
| 6,332,372 B1 | * | 12/2001 | Takenaka et al. | 74/490.05 |
| 6,438,454 B1 | * | 8/2002 | Kuroki | 700/245 |
| 6,507,773 B1 | * | 1/2003 | Parker et al. | 700/258 |
| 6,604,021 B1 | * | 8/2003 | Imai et al. | 700/245 |

FOREIGN PATENT DOCUMENTS

| | | |
|---|---|---|
| JP | 7-205069 | 8/1995 |
| WO | WO 00/147372 | 8/2000 |

\* cited by examiner

*Primary Examiner*—Tony Winner
(74) *Attorney, Agent, or Firm*—Squire, Sanders & Dempsey (57) ABSTRACT

The height from floor surface contact ends of leg linkages 2 to shoulder joints of a biped robot 1 when the biped robot is in an upright posture is defined to be a value falling within a range ($H_{avg} \pm \frac{1}{2}\sigma$) set based on an averaged value $H_{avg}$ obtained by averaging the heights of a group of objects (subject to operation) from the floor surface and the standard deviation $\sigma$ thereof, specifically a value in a range of from approximately 700 mm to 1000 mm. By this, the installation height of shoulder joints from the floor surface can be optimally determined in accordance with the heights of the objects, thereby improving operating efficiency in an existing operating space.

6 Claims, 8 Drawing Sheets

BIPED ROBOT

TECHNICAL FIELD

The present invention relates to a biped robot, particularly to a technique for determining the size of a biped robot, still more particularly to a biped robot wherein the installation height of shoulder joints and the like from the floor surface is optimally determined in accordance with the heights of a group of objects subject to operation, thereby improving operating efficiency in an existing operating space.

BACKGROUND ART

This applicant has led the world in research and development aimed at realizing biped robots capable of walking activities closely resembling those of human beings. And through the biped robots it proposed up to now has enabled stable robot walking on level ground, upgrades and downgrades, one-leg standing, and ascent/descent of stairs and level differences, thus realizing biped robots capable of adapting to various existing locomotion environments.

Further, it has made feasible use of arms connected to the robot body for operations such as tightening of screws and nuts with a driver (screwdriver) or wrench (spanner), and, in addition, has, by systematically coordinating movements of the legs and arms, made it possible to conduct complex operations such as opening/closing and passing through doors and pushing hand carts. These operations are the result of arm-leg cooperation achieved on a high-order and can be said likely to be a major factor in markedly upgrading compatibility with humans.

Thus the biped robots being researched and developed by the applicant have replaced people in performing various operations in existing operating venues (home, factory etc.) and, for the first time ever, suggested their potential to make coexistence with humans a reality.

In its research and development of these biped robots, however, the applicant has given the robots heights (total length in the vertical direction when in upright posture) of 1600 mm to 1800 mm, near average adult height, not only to make their walking movements close to those of human beings but also to give them a more human-like appearance.

Moreover, various technologies have been put forward regarding biped robots, including diverse proposals with respect to their size. In papers such as "Design and Development of Research Platform for Perception-Action Integration in Humanoid Robot: H6" (5th Robotics Symposia) and "Preliminary Motion Experiments of a Humanoid Robot Saika-3" (18th Annual Conference of the Robotics Society of Japan), for example, biped robots given a height of 1200 mm to 1300 mm are proposed from the aspects of enabling activities in existing operating spaces and achieving small size and light weight.

A number of inconveniences arise when an attempt is made to put a biped robot of the approximately 1600 mm to 1800 mm height adopted by the applicant heretofore into operation in an existing operating space. One that can be mentioned is the amount of battery power consumption. Moreover, greater height is accompanied by increased weight, but the lightest weight possible is preferable when coexistence with people at home, factories and the like is a consideration.

Further, there are many objects subject to operation (working) in an operating space, particularly in a home environment, which are ergonomically located at heights facilitating use not only by adults but also by children, wheelchair users and others, so that it cannot be said that a size near the average adult height (more exactly, the height of the shoulder joints determined therefrom, still more exactly, the arm linkage swing range (height) determined by the shoulder joint height) is necessarily appropriate for the height of the objects subject to operation. Furthermore, in the interest of still better compatibility with people, a robot should preferably be of a size that makes it more likable to people, and from this point also, it cannot be said that a size near average adult height is necessarily appropriate.

On the other hand, points such as weight reduction and likability can be improved by adopting a height of or near 1200 mm to 1300 mm as indicated by the aforesaid prior art. The fact is, however, that the aforesaid prior art etc. has fallen short of giving any consideration to joint height in actually performing operations or to size-related issues such as arm linkage length and the like, and when such a biped robot has actually been set to performing operations, it has been merely scaled down without optimizing the height relationship with the objects, which has made performance efficiency low and led to the following various problems being left unresolved.

For example, in the multi-degree-of-freedom arms of a robot (in a biped robot, the leg linkages and the arm linkages; the shoulder joints of the arm linkages being a particular concern here) there are generally present singularities (singular points) that restrict their movement, and, where consideration is given to performance, these singularities should preferably avoided in determining operation procedures.

Further, in performing different kinds of operations, the position of the object needs to be accurately ascertained with a visual sensor and, therefore, the relative positional relationship between the visual sensor and the object must be thoroughly taken into account.

DISCLOSURE OF THE INVENTION

An object of the present invention is therefore to overcome the aforesaid inconveniences and relates to a biped robot wherein the installation height of shoulder joints and the like from the floor surface is optimally determined in accordance with the heights of a group of objects subject to operation, thereby enabling performance efficiency to be improved in an existing operating space.

In order to solve the aforesaid problems, there is provided a biped robot having at least a body, two leg linkages each swingably connected to the body through hip joints, and two arm linkages each swingably connected to the body through shoulder joints, such that it walks over a floor surface in an operating space by swinging the leg linkages and performs operations on objects in the operating space by driving at least the arm linkages, characterized in that: a height from the floor surface which ends of the leg linkages contact to the shoulder joints when the robot is in an upright posture is determined to be a value that falls within a range set based on an averaged value obtained by averaging heights of he objects from the floor surface and a standard deviation σ of the averaged value.

Since the biped robot is configured so that the height from floor surface contact ends of the leg linkages to the shoulder joints in an upright posture is a value falling within a range set based on an averaged value obtained by averaging the heights of the objects (subject to operation) from the floor surface and the standard deviation σ thereof, the installation height of the shoulder joints from the floor surface can be optimally determined in accordance with the heights of the objects, whereby the efficiency of performance in an existing operating space can be improved.

More specifically, the swingable range (height) of the arm linkages connected through the shoulder joints can be optimally determined by optimizing the shoulder joint height in accordance with the heights of the group of objects subject to operation, whereby performance with respect to the objects can be improved.

The biped robot is configured so that the aforesaid range is from 700 mm to 1000 mm.

Since the biped robot is configured so that the range of the shoulder joint height is from 700 mm to 1000 mm, performance with respect to a group of objects subject to operation in a home environment, i.e., objects positioned at heights for easy use by everyone from adults to children, wheelchair users and so on, can be particularly improved. Further, defining the height of the shoulder joints from the floor surface to some degree collaterally determines the overall robot size, including its height. Setting the height of the shoulder joints in the range of from 700 mm to 1000 mm in the aforesaid manner also helps to provide a biped robot presenting a likable appearance, because the height of the robot, insofar as it is to emulate a human being, becomes approximately from 1000 mm to 1300 mm.

The biped robot is configured so that the arm linkages are composed of at least upper arms each swingably connected to the body through the shoulder joints and forearm links each swingably connected to the upper arm links through elbow joints and the length of the upper arm links is defined based on the standard deviation σ.

The biped robot is configured so that the arm linkages are composed of at least upper arm links each swingably connected to the body through the shoulder joints and forearm links each swingably connected to the upper arm links through elbow joints and the length of the upper arm links is defined based on the standard deviation σ of the heights of the group of objects, and, therefore, the length of the upper arm links can be optimally determined in accordance with the heights of the objects to further improve performance with respect to the objects.

More specifically, performance with respect to the objects can be further improved by defining an upper arm link length that enables improvement of the degree of freedom of the upper arm links in a height region in which the distribution density of the heights of the objects is high.

There is provided a biped robot having at least a body, two leg linkages each swingably connected to the body through hip joints, two arm linkages each swingably connected to the body through shoulder joints and equipped with hands at their extremities, such that it walks over a floor surface in an operating space by which ends of the leg linkages contact to the hands, if the shoulder joints assume a singularity posture when the robot is an upright posture, is determined to be a value that falls outside a range set based on an averaged value obtained by averaging heights of the objects from the floor surface and a standard deviation σ of the averaged value.

The biped robot is configured so that the height from the floor surface contact ends of the leg linkages to the hands in an upright posture when the shoulder joints assume a singularity posture is a value falling outside a range set based on an averaged value obtained by averaging the heights of the objects from the floor surface and the standard deviation σ thereof, more specifically, is configured so that no singularity posture of the shoulder joints is present in a region in which the distribution density of the heights of the objects subject to operation is high, and, therefore, the degree of freedom of the arm linkages in the region in which the distribution density of the heights of the objects is high can be improved, whereby performance with respect to the objects can be further improved.

There is provided a biped robot having at least a body, two leg linkages each swingably connected to the body through hip joints, and two arm linkages each swingably connected to the body through shoulder joints and equipped with hands at their extremities, and a hand hand swingably connected to the body through a neck joint and installed with a visual sensor composed of an imaging device, such that it walks over a floor surface in an operating space by swinging the leg linkages and performs operations on objects in the operating space by driving the arm linkages based on at least information on the operating space obtained from imagery taken by the imaging device, characterized in that: the imaging device is installed such that optical axes connecting the hands and the imaging device make angles within a range of from 5 degrees to 45 degrees with respect to the horizontal direction if the arm linkages are positioned in a horizontal direction parallel to the floor surface when the robot is in an upright posture.

The biped robot is configured so that the imaging device is installed in such a way that the optical axes connecting the hands and the imaging device when the arm linkages are positioned in a horizontal direction parallel to the floor surface make angles in the range of from 5 degrees to 45 degrees with respect to the horizontal direction, i.e., by specifying the angles at which the imaging device images the objects to be an angle in the range of from 5 degrees to 45 degrees when the biped robot is in an upright posture, constantly stable image recognition can be enabled, whereby performance with respect to the objects can be further improved.

The biped robot is configured so that a height from the floor surface ends of the leg linkages contact to the shoulder joints is in a range of from 700 mm to 1000 mm and the imaging device is installed such that a difference between the height of the shoulder joints and a height of the imaging device from the floor surface is in a range of 150 mm to 250 mm, when the robot is in an upright posture.

Since the biped robot is configured so that the height from the floor surface contact ends of the leg linkages to the shoulder joints is in the range of from 700 mm to 1000 mm and the imaging device is installed in such a way that the difference in the heights of the shoulder joints and the imaging device from the floor surface is in the range of 150 mm to 250 mm when the biped robot is in an upright posture, performance with respect to the objects in a home environment, i.e., objects positioned at heights for easy use by everyone from adults to children, wheelchair users and so on, can be particularly improved. Further, defining the difference in the heights of the shoulder joints and the imaging device from the floor surface in the aforesaid manner enables constantly stable image recognition, whereby performance with respect to the objects can be further improved. In addition, the height of the robot comes to be approximately from 1000 mm to 1300 mm, which helps to provide a biped robot presenting a likable appearance.

BRIEF EXPLANATION OF THE DRAWINGS

FIG. 6 is an explanatory view showing the heights of a group of objects subject to operation that are articles the biped robot shown in FIG. 1 operates on.

BEST MODE OF CARRYING OUT THE INVENTION

A biped robot according to an embodiment of the present invention will be explained with reference to the attached drawings in the following.

Figure 1:
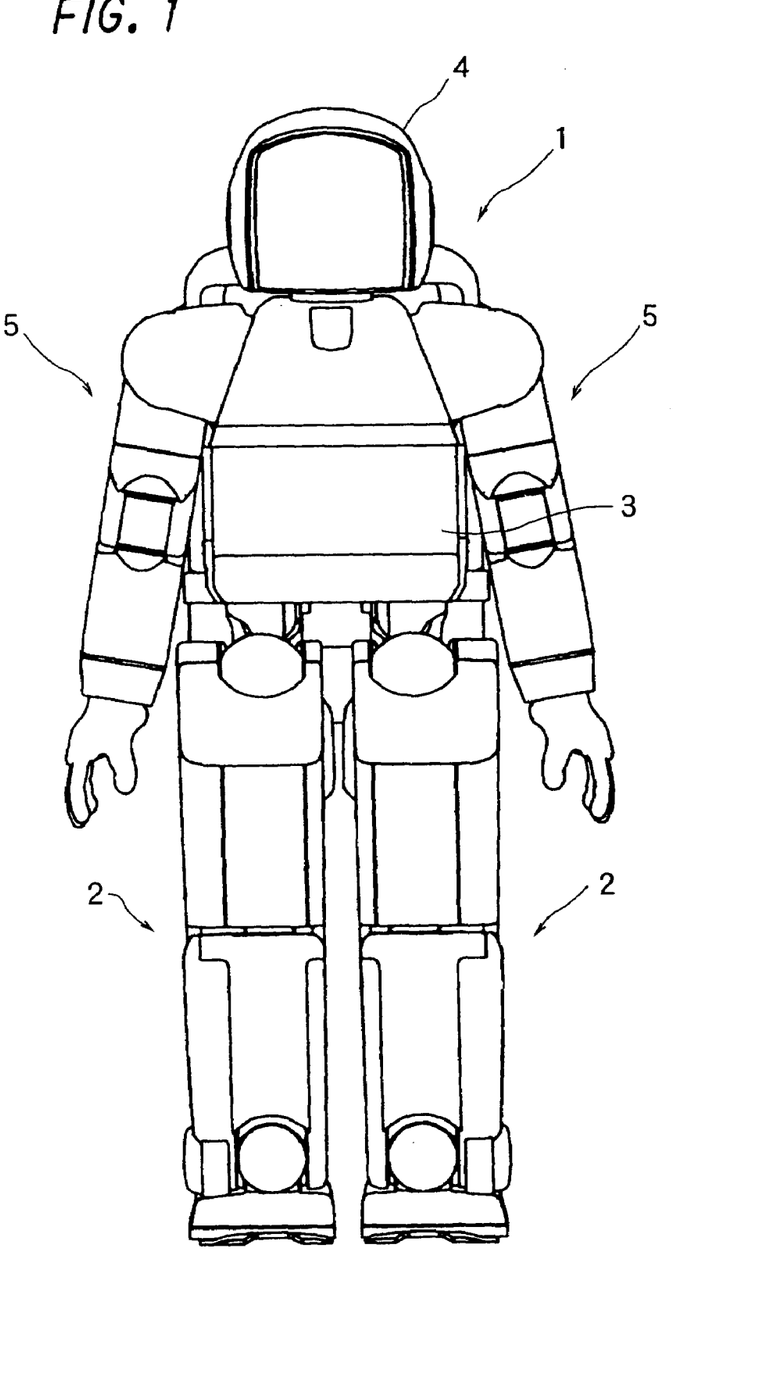
FIG. 1 is a front view of a biped robot according to an embodiment of the present invention.
Figure 2:
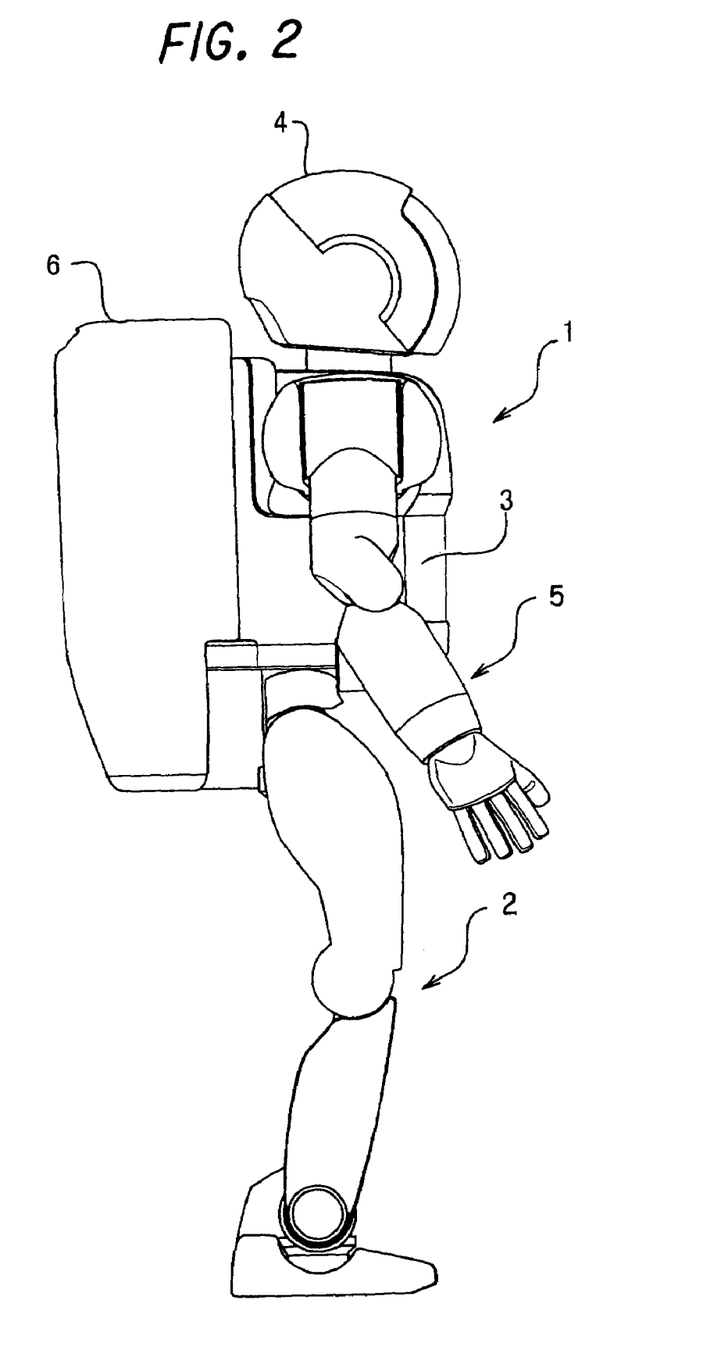
FIG. 2 is a right side view of the biped robot shown in FIG. 1.

FIG. 1 is a front view of a biped robot (hereinafter called simply "robot") 1 according to an embodiment of the present invention, and FIG. 2 is a side view thereof.

As shown in FIG. 1, the robot 1 is equipped with two leg linkages 2, above which is provided a body (upper body) 3. A head 4 is formed at the upper part of the body 3 and two arm linkages 5 are connected to opposite sides of the body 3. Further, as shown in FIG. 2, a housing unit 6 is provided on a back part of the body 3, inside which are accommodated, inter alia, a control unit (explained later) and a battery power supply (not shown) for electric motors (drive sources; explained later) for driving joints of the robot 1. The robot 1 shown in FIGS. 1 and 2 is one shown attached with covers for protecting its internal structure.

The internal structure of the aforesaid robot 1 will now be explained with reference to FIG. 3, focusing chiefly on the joints.

As illustrated, the right and left leg linkages 2 of the robot 1 are each equipped with six joints.

The twelve joints comprise joints 10R, 10L (R and L indicating the right and left sides; hereinafter the same) around the hip vertical axis (Z axis or gravity 25 axis) for leg swiveling, roll direction (around X axis) joints 12R, 12L of hips (crotch), pitch direction (around Y axis) joints 14R, 14L of the hips (crotch), pitch direction (around Y axis) joints 16R, 16L of knees, pitch direction (around Y axis) joints 18R, 18L of ankles, and roll direction (around X axis) joints 20R, 20L of the ankles. Feet (foot members) 22R, 22L are attached at lower parts of the leg linkages 2R(L).

Thus each leg 2 comprises the hip joints (crotch joints) 10R(L), 12R(L) and 14R(L), knee joint 16R(L) and ankle joints 18R(L) and 20R(L). The hip joints and knee joint are connected by a thigh link 24R(L) and the knee joint and ankle joints by a crus link 26R(L).

Figure 3:
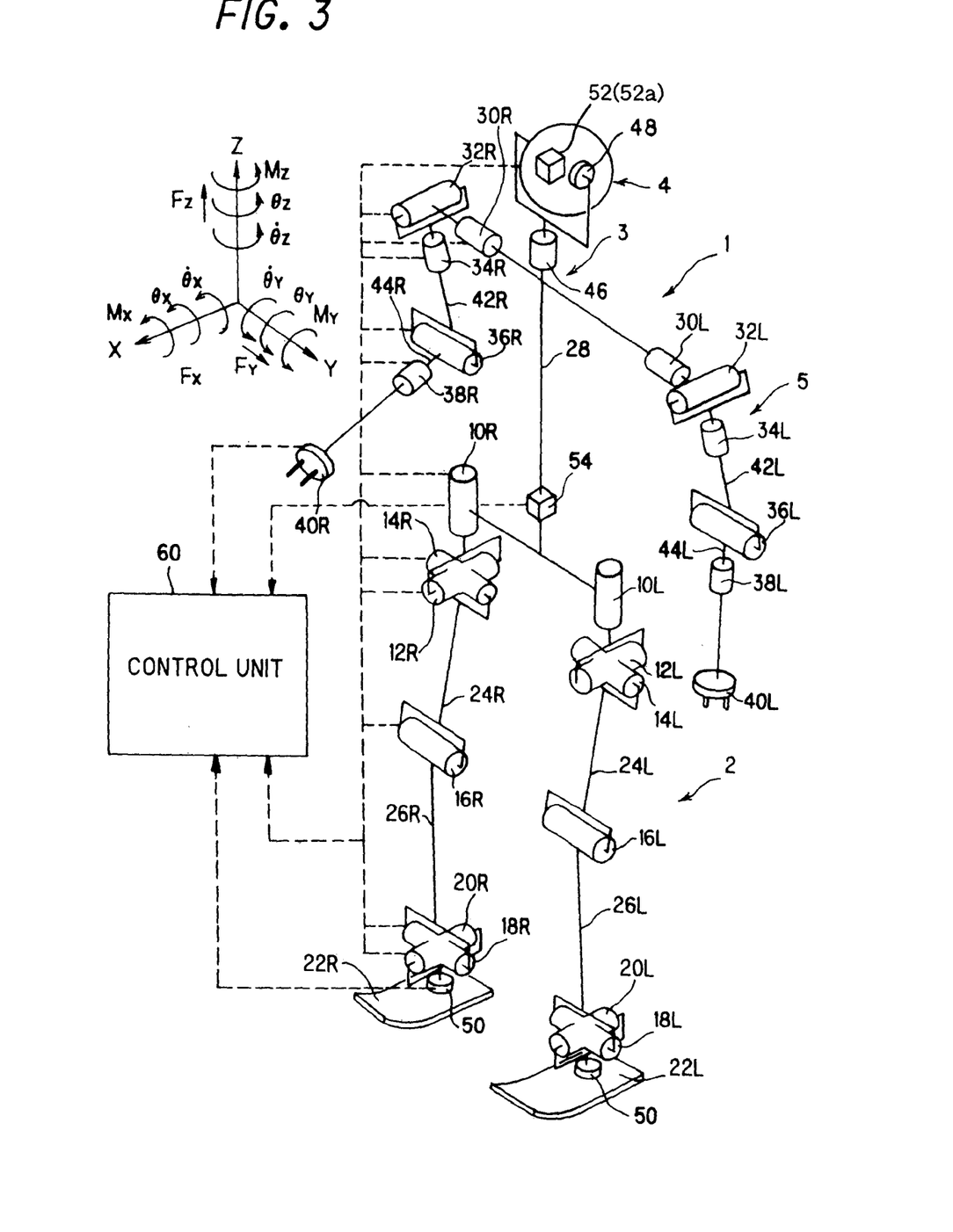
FIG. 3 is a schematic diagram showing the overall internal structure of the biped robot of FIG. 1 with focus on the joints.

The legs (leg linkages) 2 are connected through the hip joints to the body 3, which is represented in FIG. 3 simply by a body link 28. The arm linkages 5 are connected to the body 3, as set out above.

The arm linkages 5 comprise pitch direction joints 30R, 30L of shoulders, roll direction joints 32R, 32L of the shoulders, joints 34R, 34L around the vertical axis for arm swiveling, joints 36R, 36L around the pitch axis of elbow parts, and joints 38R, 38L around the vertical axis for wrist swiveling. Hands (end effectors) 40R, 40L are attached to the distal ends of the wrists.

Thus each arm linkage 5 comprises the shoulder joints 30R(L), 32R(L), 34R(L), the elbow joint 36R(L) and the wrist joint 38R(L). Further, the shoulder joints and the elbow joint are connected by an upper arm link 42R(L) and the elbow joint and the hand by a forearm link 44R(L).

The head 4 is connected to the body 3 through a neck joint 46 around a vertical axis and a head rotation (nod) mechanism 48 for rotating the head 4 at an axis perpendicular thereto.

Owing to the foregoing configuration, the leg linkages 2 are imparted with a total of twelve degrees of freedom with respect to the left and right legs, so that during locomotion the legs as a whole can be imparted with desired movements by driving the twelve joints to appropriate angles to enable desired walking in three-dimensional space. Further, the arm linkages 5 are each given five degrees of freedom with respect to the left and right arms, so that desired operations can be carried out by driving these joints to appropriate angles. In addition, the head 4 is given two degrees of freedom and the head 4 can be faced in a desired direction by appropriately driving the joint 46 and/or the head rotation mechanism 48 to appropriate angles.

A conventional six-axis force sensor 50 is attached to the foot 22R(L) below the ankle joints and, of the external forces acting on the robot, detects the floor reaction force components Fx, Fy and Fz of three directions and the moment components Mx, My and Mz of three directions acting on the robot from the surface of contact.

Further, a parallel-optical-axis type visual sensor 52 composed of two imaging devices 52a (CCD cameras; 250 thousand pixels) 52a (only one shown) is mounted at an appropriation location of the head 4 to take images of the operating space in directions according to the rotation of the head 4.

An inclination sensor 54 is mounted on the body 3 to detect inclination relative to the vertical axis and the angular velocity thereof. Further, the electric motors of the respective joints relatively displace the links 24, 26R(L) etc. through speed reducers that reduce the speed and increase the torque of their outputs, and rotary encoders (not shown) are provided to detect the amount of rotation thereof.

As mentioned above, a control unit 60 comprises a microcomputer is, together with other components, housed inside the housing unit 6, and the outputs of the six-axis force sensor 50 etc. (for simplicity of illustration, only those from the right side of the robot 1 are shown) are sent to the control unit 60).

Figure 4:
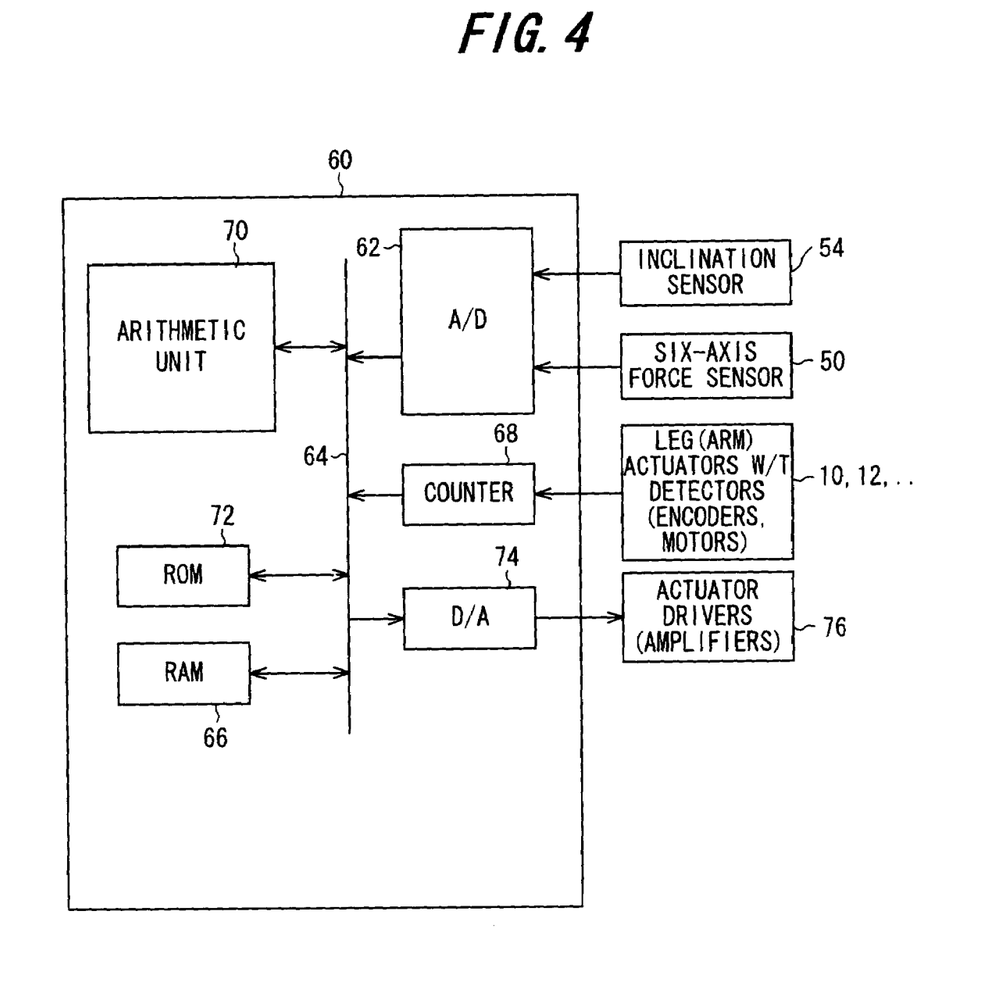
FIG. 4 is a block diagram showing details of a control unit shown in FIG. 3.

FIG. 4 is a block diagram showing the configuration of the control unit 60 in detail.

As illustrated, the control unit 60 comprises a microcomputer. Here the outputs from the inclination sensor 54 etc. are converted into digital signals by an A/D converter (indicated as "A/D" in the drawing) 62 and the output thereof is sent via a bus 64 to a RAM 66. Further, the outputs of encoders disposed adjacent to the electric motors at the respective joints are input to the RAM 66 through a counter 68.

An arithmetic unit 70 composed of a CPU is provided in the control unit 60; and based on data stored in a ROM 72 and the sensor outputs, the arithmetic unit 70 computes the control values (control inputs) needed for driving the joints and outputs them to the motors for driving the joints through a D/A converter (indicated as "D/A" in the drawing) 74 and actuator drivers (amplifiers) 76 provided at the individual joints. The output of the visual sensor 52 is input to an unshown image processor and after being subjected to appropriate processing is inputted to the control unit 60 as external information, specifically positional information on the operating space and the objects subject to operation, an used, inter alia, to determine the drive amounts (control values) of the respective joints.

Explanation will next be made with reference to FIGS. 5 to 8 regarding determination of the position (height) and the like of the shoulder joints of the robot 1 according to this invention.

Figure 5:
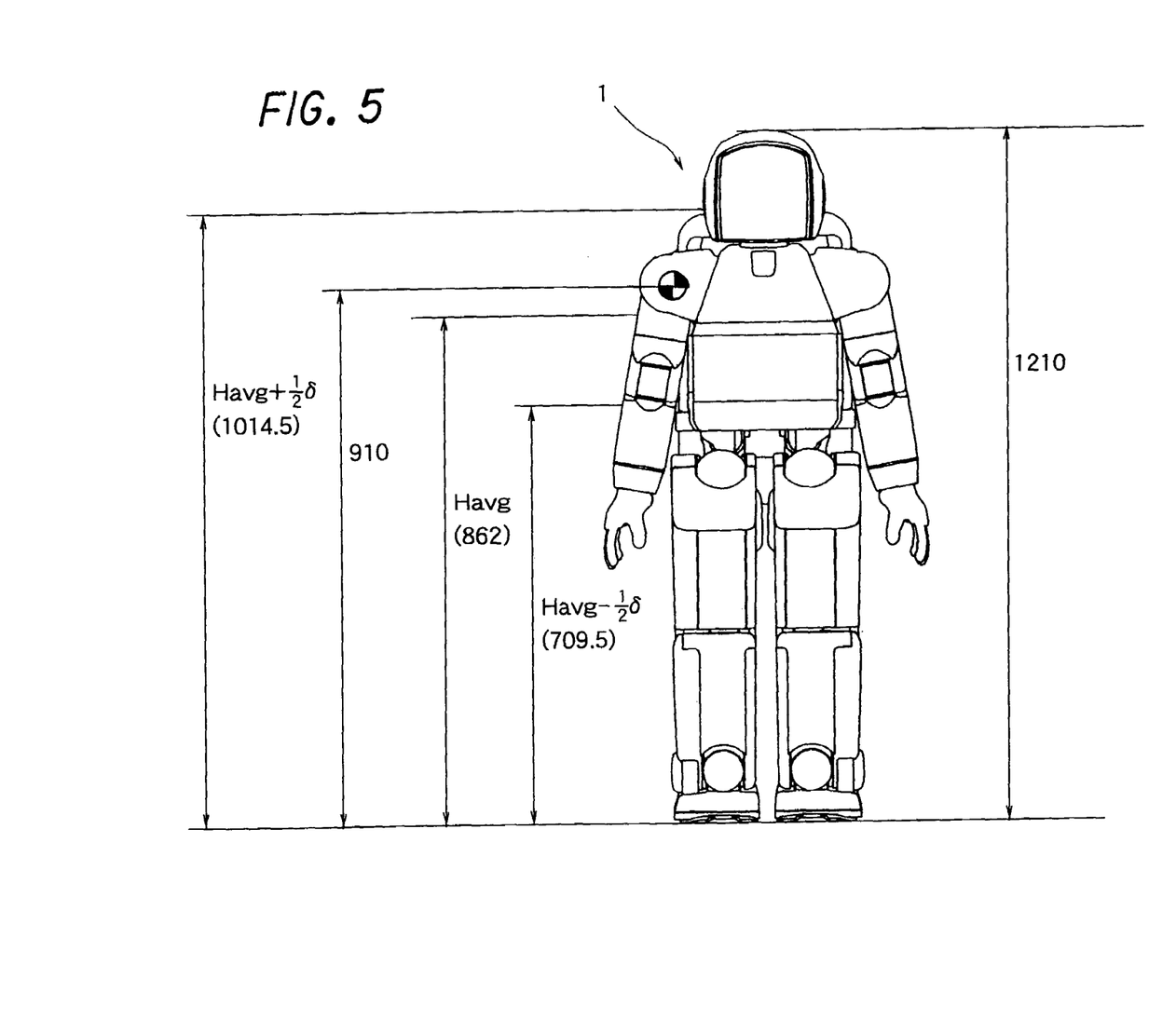
FIG. 5 is a front view showing, inter alia, the height of shoulder joints of the biped robot of FIG. 1.

FIG. 5 is a front view showing, inter alia, the height from the floor surface of the shoulder joints of the biped robot 1.

Before continuing the explanation of FIG. 5, explanation will be made with reference to FIG. 6 regarding the objects or articles on which the robot 1 according to this embodiment operates or works. The purpose of the robot 1 according to this embodiment is to conduct light operations chiefly in a home environment ("home environment" is herein termed in a broad sense encompassing offices and such). As objects of the light operations in the home environment there can be mentioned ones like those indicated in FIG. 6, for instance. The relationship between the objects and their heights from the floor surface indicated in FIG. 6 are some of those recommended by the JIS (Japanese Industrial Standards) on construction, which in addition to those shown in FIG. 6 also prescribe recommended heights for, for example, coat hangers and a large number of other furnishings used in home environments.

Figure 6:
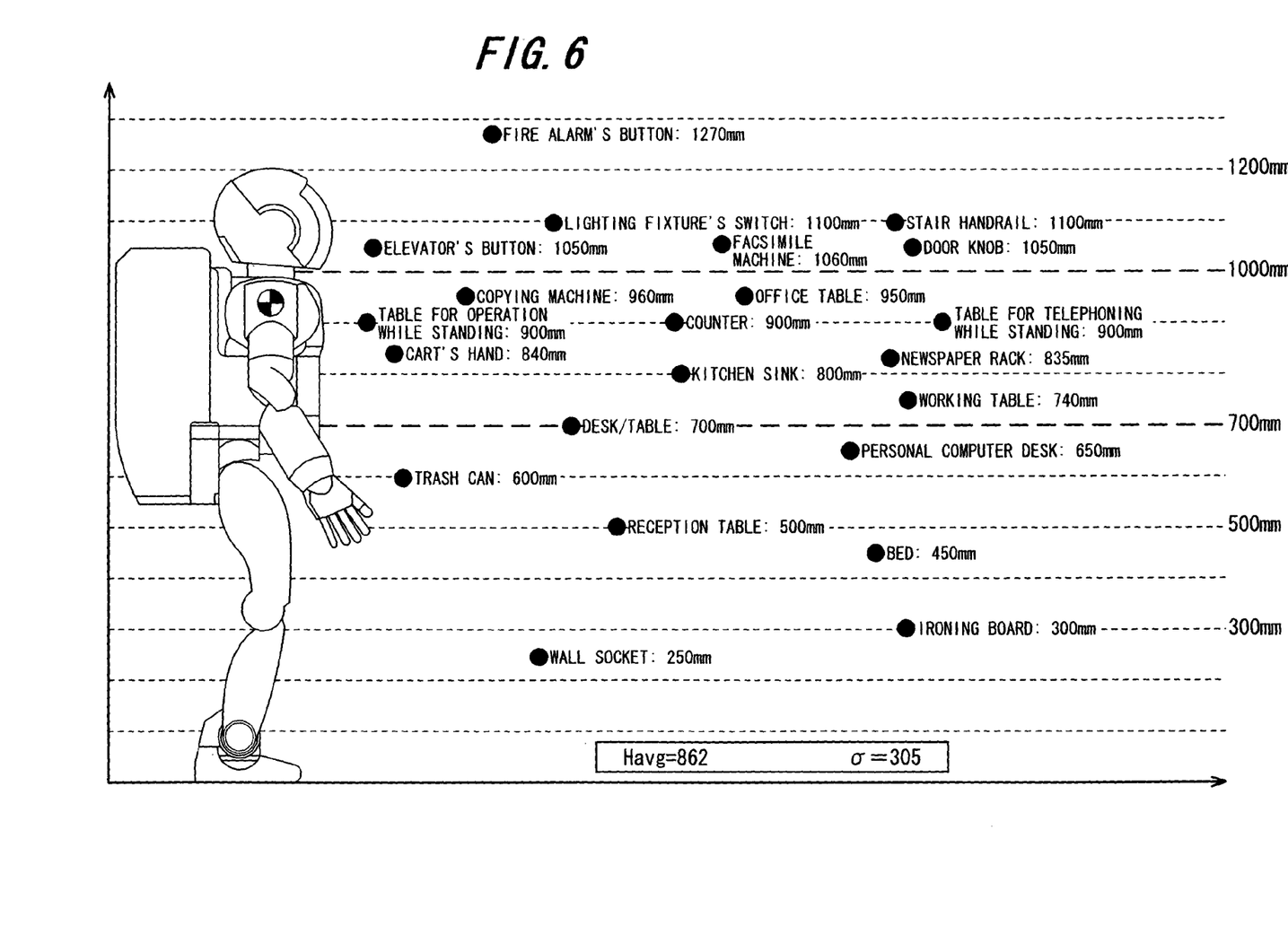

As can be seen from FIG. 6, many of the objects subject to operation in a home environment are distributed within a distinct height range, specifically a range of from 700 mm to 1100 mm. Now taking the averaged value Havg of the heights of the group of objects subject to operation, we get about 862 mm (but note that this averaged value includes the recommended heights of various articles other than the objects (subject to operation) shown in FIG. 6). Further, if we derive the standard deviation $\sigma$ of the distribution of these using the conventional standard deviation equation, we get about 305 mm (like averaged value Havg, not limited to the objects shown in FIG. 6). That is, it can be said that the objects are concentrated in the range of averaged value Havg±½ standard deviation $\sigma$ (709.5 mm to 1014.5 mm). This tendency can naturally be frequently observed in factories and other human activity spaces.

Next, a height of the shoulder joints of the robot 1 from the floor surface (namely, a height from the contact ends of the leg linkages, i.e., the bottom of the feet 22L(R)) which is compatible with the objects will be considered. Where the robot 1 is a biped robot emulating a human being, then once the height of the shoulder joints from the floor surface is determined, the ranges within which the height, length of the arm linkages 5 and the like thereof can fall come to be limited from the viewpoint of appearance. Once the approximate length of the arm linkages is set, the swing range of the overall arm linkages, more specifically the operating region of the hands 40L(R) is also determined from the swing ranges of the shoulder joints and elbow joints.

As a result of persistent research and development in light of these facts, the inventors learned that by defining the height of the shoulder joints from the floor surface as approximately "averaged value Havg±½ standard deviation $\sigma$ of object heights," it is possible to use joints having an ordinary movable range and, while maintaining an upright posture, to position the hands 40L(R) in the overall height range in which the objects subject to operation is concentrated, thereby enabling improvement of performance without placing excessive load on the joints.

Further, "averaged value Havg±½ standard deviation $\sigma$ of object heights" is within the aforesaid range of 709.5 mm to 1014.5 mm and can be said to be approximately 700 mm to 1000 mm. If the height of the shoulder joints becomes about 700 mm to 1000 mm, then when emulating a human being, the height ordinarily becomes about 1000 mm to 1300 mm. This is a height corresponding to that of children in the lower grades of elementary school and, therefore, by setting the shoulder joint height at 700 mm to 1000 mm, a robot can be provided that offers high performance in a home environment and an appearance (size) that is likable and has compatibility with human society.

As set out above, the arm linkages 5 are composed of the upper arm links 42L(R), the forearm links 44L(R) and multiple joints. Further, the ratio of the lengths of the upper arm links 42L(R) and the forearm links 44L(R) is about 1 to 1 when a human being is emulated. Therefore, by setting the length of the upper arm links 42L(R) longer than "½ standard deviation $\sigma$," the length of the arm linkages 5 can as a result be made longer than "standard deviation $\sigma$." Owing to this, it is possible by providing the shoulder joints within the range of the aforesaid "averaged value Havg±½ standard deviation $\sigma$ object heights" to enable the hands 40L(R) to reach the group of objects subject to operation smoothly and reliably, thereby further improving performance with respect to the objects.

For the above reasons, in robot 1 according to this embodiment, the height of the shoulder joints from the floor surface is, as shown in FIG. 5, set at 910 mm. By this, the performance in a home environment is high and an appearance (height of 1210 mm) that is likable and has compatibility with human society can be achieved.

Figure 7:
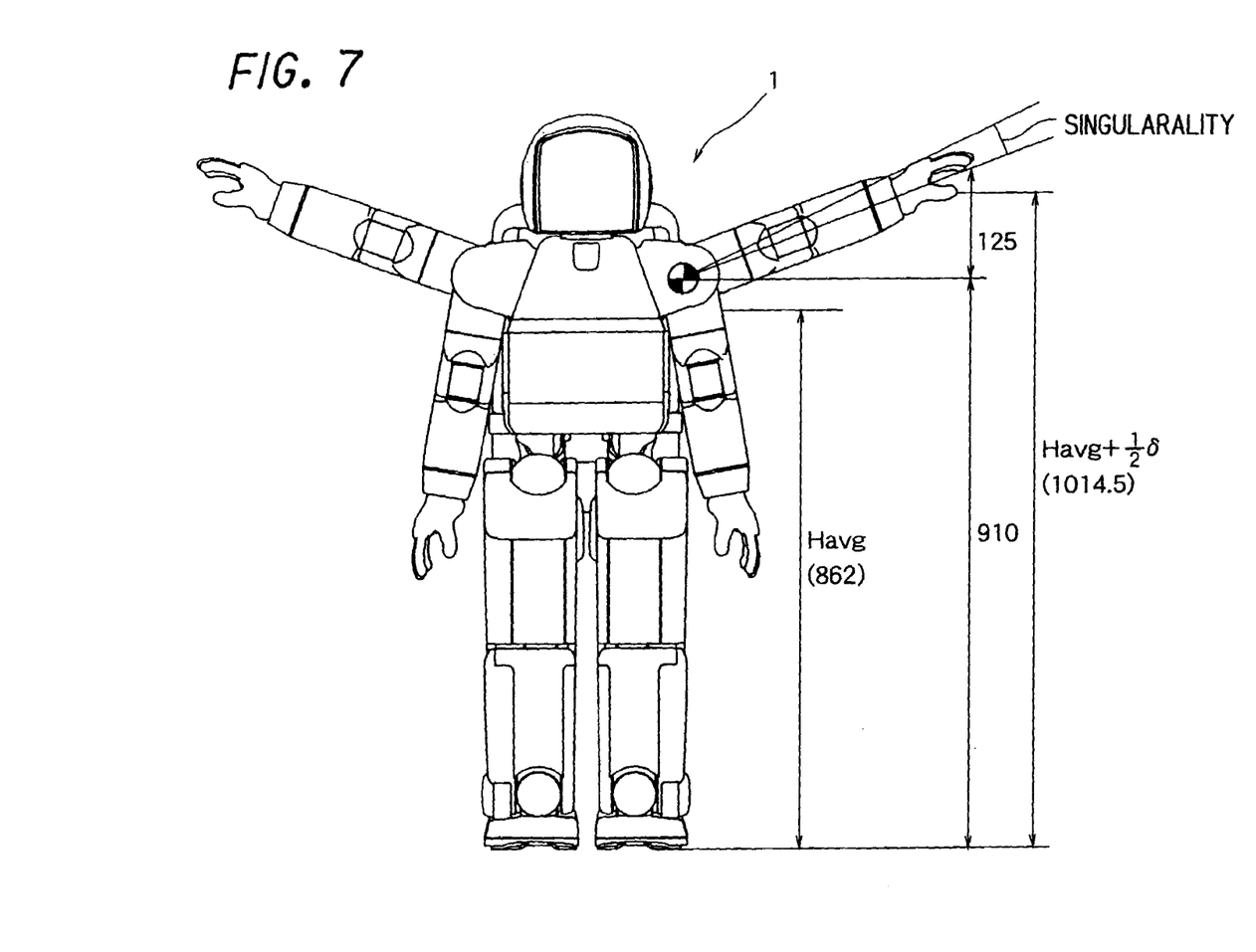
FIG. 7 is a front view of showing, inter alia, the height of singularity postures of the shoulder joints of the biped robot shown in FIG. 1.

Explanation will next be made with reference to FIG. 7 regarding the configuration of the arm linkages 5, more specifically the singularity postures of the shoulder joints.

As set out above, the shoulder joints are three-degree-of-freedom joints composed of joints 30R(L), 32R(L), 34R(L). As pointed out in the foregoing, singularity postures that limit movement are present in such multi-degree-of-freedom joints. It is therefore preferable not to allow these singularity postures to be present within the range of the group of objects subject to operation.

Owing to this, the robot 1 according to this embodiment is configured so that the singularity postures are not allowed to be present within the range of the group of objects subject to operation, i.e., within "averaged value Havg±½ standard deviation $\sigma$ object heights." Specifically, they are configured so as to be present when the hands 40L(R) are driven to higher positions (1035 mm) than "averaged value Havg+½ standard deviation $\sigma$ of object heights" (1014.5 mm), which is the maximum value of the height of the objects. By defining them in this way, the performance of the robot 1 with respect to the objects can be further improved. As a method of configuring the singularity postures is set out in detail in Japanese Laid-Open Patent Application No. 11(1999)-188668 proposed earlier by this applicant, explanation is omitted here.

Explanation will next be made with reference to FIG. 8 regarding the positional relationship between the shoulder joints and the imaging devices 52a and regarding the angle between the imaging devices 52a and the hands 40L(R).

Figure 8:
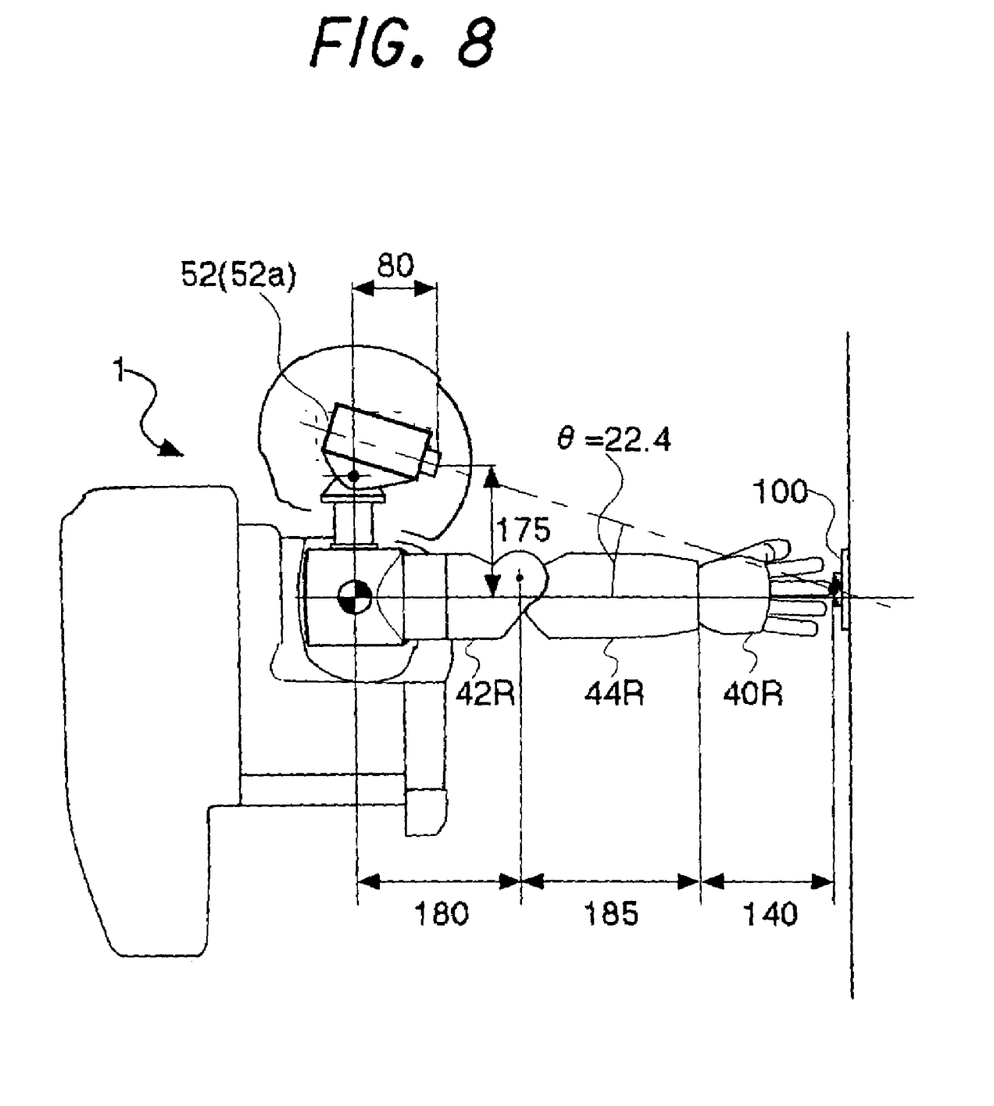
FIG. 8 is a partial side view showing, inter alia, the relationship between the height of shoulder joints and a visual sensor of the biped robot shown in FIG. 1.

FIG. 8 is an explanatory diagram schematically illustrating the positional relationship between an arm linkage 5 (showing the right side (right arm)) in a horizontally extended state and the visual sensor 52, more exactly the imaging devices 52a (only one shown).

Before explaining FIG. 8, a simple explanation will first be made regarding the relationship between the angle of the optical axis of the visual sensor 52 to the imaged object and the image recognition rate. When the angle of the optical axis of the visual sensor 52 to the imaged object (the angle between the optical axis of the visual sensor 52 and the horizontal direction of imaged object) becomes large (i.e., when the elevation angle or depression angle becomes large), the image recognition rate declines. Specifically, it exhibits a normal distribution centered on angle 0. The inventors learned through various experiments that the range of tolerable angles in practical application is ±45 degrees (from an elevation angle of 45 degrees to a depression angle of 45 degrees). Containing the angle between the optical axis of the visual sensor 52 and the imaged object within the range of ±45 degrees is therefore a prerequisite.

Then, in determining the attachment height of the visual sensor 52, care must be taken to contain the angle between its optical axis and the imaged object, i.e., the object subject to operation (designated by reference symbol 100 in FIG. 8), within the range of ±45 degrees, as stated above. It cannot be uniquely determined, however, when the group of objects subject to operation is adopted as the reference. On the other hand, it is the hands 40L(R) that actually touch and conduct operations on the object and, therefore, by regarding the hands 40L(R) as the object, the installation height of the imaging devices 52a can be determined so that the angle of the optical axes of the imaging devices 52a with respect to the object fall in the range of ±45 degrees.

Returning to the explanation of FIG. 8, as illustrated, the arm linkages 5 comprise 180 mm upper arm links 42L(R), 185 mm forearm links 44L(R) and 140 mm hands 40L(R), and have a length of 505 mm. Further, the lens surfaces of the imaging devices 52a are located apart from the vertical axis of the shoulder joints by a horizontal distance of about 80 mm.

The horizontal distance from the imaging devices 52a to the object 100 is therefore 425 mm. Their vertical direction distance from the shoulder joints (difference in height from the floor surface) is determined based on this horizontal distance so that the angle of the optical axes of the imaging devices 52a with respect to the object 100 (hands 40L(R)) is in the range of ±45 degrees. In this embodiment, the vertical direction distance is made 175 mm, whereby the angle of the optical axes of the imaging devices 52a with respect to the hands 40L(R) when the hands 40L(R) are positioned in the horizontal direction, specifically the elevation angle, is 22.4 degrees.

Since the elevation angle is 22.4 degrees, higher objects (to an elevation angle of 45 degrees) can of course be accurately recognized, as can lower objects (to a depression angle of 45 degrees). The horizontal distance from the imaging devices 52a to the hands 40L(R) is 425 mm as noted above, so, in theory, is should be possible to accurately recognize objects with a height difference relative to the shoulder joints between +600 (=425+175) and −250 (=−(425−175)) mm.

In actuality, since the hands 40L(R) approach the body in proportion as the arm linkages 5 are driven upward or downward, the horizontal distance from the imaging devices 52a to the hands 40L(R) shortens to make it difficult to accurately recognize objects within the aforesaid range, but, at any rate, it is possible to accurately recognize them within the range of "averaged value Havg±½ standard deviation σ of object heights." As a result, constantly stable image recognition can be enabled, whereby performance with respect to the objects can be further improved.

Further, the inventors learned that in order to accurately recognize the group of objects within the range of the aforesaid "averaged value Havg±½ standard deviation σ of object heights" it suffices to set the angle of the optical axes of the imaging devices 52a with respect to the aforesaid hands 40L(R) in the range of from +5 degrees to +45 degrees (elevation angle of from 5 degrees to to 45 degrees). Note that angles below +5 degrees are not present because the imaging devices 52a are mounted in the head 4, i.e., above the shoulder joints. In the robot 1 according to this embodiment, the aforesaid angle can be realized by defining the difference in the heights of the shoulder joints and the imaging devices 52a from the floor surface at from approximately 150 mm to 250 mm.

As set out above, in the robot 1 according to this embodiment, by determining the height of the shoulder joints in accordance with the heights of the group of objects subject from the floor, specifically by setting the height of the shoulder joints at 700 mm to 1000 mm, a robot can be provided that offers high performance in a home environment and an appearance (size) that is likable and has compatibility with human society.

Moreover, the performance with respect to the group of objects can be even further improved because the robot is configured so that singularity postures are not allowed to be present within the range of the group of objects, i.e., within "averaged value Havg±½ standard deviation σ of object heights."

Further, since the angle of the optical axes of the imaging devices 52a with respect to the hands 40L(R) is set in the range of from +5 degrees to +45 degrees, constantly stable image recognition can be enabled, whereby performance with respect to the group of objects can be further improved.

As set out above, in this embodiment, there is provided a biped robot 1 having at least a body 3, two leg linkages 2 each swingably connected to the body through hip joints 10, 12, 14R(L), and two arm linkages 5 each swingably connected to the body through shoulder joints 30, 32, 34R(L), such that it walks over a floor surface in an operating space by swinging the leg linkages and performs operations on objects in the operating space by driving at least the arm linkages, characterized in that: a height from the floor surface which ends of the leg linkages (bottom of the feet 22R, L) contact to the shoulder joints when the robot is in an upright posture is determined to be a value that falls within a range (Havg±½σ) set based on an averaged value obtained by averaging heights of the objects from the floor surface and a standard deviation σ of the averaged value.

Since the biped robot is configured so that when the biped robot is in an upright posture the height from floor surface contact ends of the leg linkages to the shoulder joints is a value within a range set based on an averaged value obtained by averaging the heights of a group of objects (subject to operation) from the floor surface and the standard deviation σ thereof, the installation height of the shoulder joints from the floor surface can be optimally determined in accordance with the heights of the objects, whereby the efficiency of performance in an existing operating space can be improved.

More specifically, the swingable range (height) of the arm linkages connected through the shoulder joints can be optimally determined by optimizing the shoulder joint height in accordance with the heights of the objects, whereby performance with respect to the objects can be improved.

Further, the biped robot is configured so that the aforesaid range is from 700 mm to 1000 mm.

Since the biped robot is thus configured so that the range of the shoulder joint height is from 700 mm to 1000 mm, performance with respect to the objects in a home environment, i.e., the objects positioned at heights for easy use by everyone from adults to children, wheelchair users and so on, can be particularly improved. Further, defining the height of the shoulder joints from the floor surface to some degree collaterally determines the overall robot size, including its height. Setting the height of the shoulder joints in the range of from 700 mm to 1000 mm in the aforesaid manner also helps to provide a biped robot presenting a likable appearance, because the height of the robot, insofar as it is to emulate a human being, becomes approximately from 1000 mm to 1300 mm.

Further, the biped robot is configured so that the arm linkages 5 are composed of at least upper arms 42R, L swingably connected to the body 3 through the shoulder joints and forearm links 44R, L swingably connected to the upper arm links through elbow joints 36R, L and the length of the upper arm links is defined based on the standard deviation σ.

Thus, the biped robot is configured so that the arm linkages are composed of at least upper arm links swingably connected to the body through the shoulder joints and forearm links swingably connected to the upper arm links through elbow joints and the length of the upper arm links is defined based on the standard deviation of the heights of the objects, and, therefore, the length of the upper arm link can be optimally determined in accordance with the heights of the objects to further improve performance with respect to the objects.

More specifically, performance with respect to the objects can be further improved by defining an upper arm link length that enables improvement of the degree of freedom of the upper arm link in the height region in which the distribution density of the heights of the objects is high.

Further, there is provided a biped robot 1 having at least a body 3, two leg linkages 2 each swingably connected to the body through hip joints 10, 12, 14R(L), and two arm linkages 5 each swingably connected to the body through shoulder joints 30, 32, 34R(L) and equipped with hands 40R(L) at their extremities, such that it walks over a floor surface in an operating space by swinging the leg linkages and performs operations on objects in the operating space by driving at least the arm linkages, characterized in that: a height from the floor surface which ends of the leg linkages (bottom of the feet 22R, L) contact to the hands, if the shoulder joints assume a singularity posture when the robot is in an upright posture, is determined to be a value that falls outside a range (Havg±½σ) set based on an averaged value Havg obtained by averaging heights of the objects from the floor surface and a standard deviation σ of the averaged value.

Thus, the biped robot is configured so that when the biped robot is in an upright posture the height from the floor surface contact ends of the leg linkages to the hands when the shoulder joints assume a singularity posture is a value falling outside a range set based on an averaged value obtained by averaging the heights of the objects from the floor surface and the standard deviation σ thereof, more specifically, is configured so that no singularity posture of the shoulder joints is formed in a region in which the distribution density of the heights of the objects is high, and, therefore, the degree of freedom of the arm linkages in the region in which the distribution density of the heights of the objects is high can be improved, whereby performance with respect to the objects can be further improved.

Further, there is provided a biped robot 1 having at least a body 3, two leg linkages 2 each swingably connected to the body through hip joints 10, 12, 14R(L), two arm linkages 5 each swingably connected to the body through shoulder joints 30, 32, 34R(L) and equipped with hands 40R(L) at their extremities, and a head 4 swingably connected to the body through a neck joint 46 and installed with a visual sensor 52 composed of an imaging device 52a, such that it walks over a floor surface in an operating space by swinging the leg linkages and performs operations on objects in the operating space by driving the arm linkages based on at least information on the operating space obtained from imagery taken by the imaging device, characterized in that: the imaging device is installed such that optical axes connecting the hands and the imaging device make angles within a range of from 5 degrees to 45 degrees with respect to the horizontal direction if the arm linkages are positioned in a horizontal direction parallel to the floor surface when the robot in an upright posture.

Thus, the biped robot is configured so that the imaging devices are installed so that when the biped robot is in an upright posture the optical axes connecting the hands and the imaging devices when the arm linkages are positioned in a horizontal direction parallel to the floor surface make angles in the range of from 5 degrees to 45 degrees with respect to the horizontal direction, i.e., by specifying the angles at which the imaging devices image the objects to be an angle in the range of from 5 degrees to 45 degrees, constantly stable image recognition can be enabled, whereby performance with respect to the objects can be further improved.

Further, the biped robot is configured so that when the biped robot 1 is in an upright posture the height from the floor surface contact ends of the leg linkages 2 to the shoulder joints is in the range of from 700 mm to 1000 mm and the imaging devices 52a are installed so that the difference in the heights of the shoulder joints and the imaging devices from the floor surface is in the range of 150 mm to 250 mm.

Thus, since the biped robot is configured so that when the biped robot is in an upright posture the height from the floor surface contact ends of the leg linkages to the shoulder joints is in the range of from 700 mm to 1000 mm and the imaging devices are installed so that the difference in the heights of the shoulder joints and the imaging devices from the floor surface is in the range of 150 mm to 250 mm, performance with respect to the objects in a home environment, i.e., the objects positioned at heights for easy use by everyone from adults to children, wheelchair users and so on, can be particularly improved. Further, defining the difference in the heights of the shoulder joints and the imaging devices from the floor surface in the aforesaid manner enables constantly stable image recognition, whereby performance with respect to the objects can be further improved. In addition, the height of the robot comes to be approximately from 1000 mm to 1300 mm, which helps to provide a biped robot presenting a likable appearance.

INDUSTRIAL APPLICABILITY

In accordance with the present invention, by determining the height of the shoulder joints of a biped robot in accordance with the heights of a group of objects (subject to operation) from the floor, specifically by setting the height of the shoulder joints at 700 mm to 1000 mm, a robot can be provided that offers high performance in a home environment and an appearance (size) that is likable and has compatibility with human society. Further, since the biped robot is configured so that singularity postures are not allowed to be present within the range of the objects, i.e., within "averaged value Havg±½ standard deviation σ of object heights," performance with respect to the objects can be further improved. In addition, since the angle of the optical axis of an imaging device with respect to hands is set in the range of from +5 degrees to +45 degrees, constantly stable image recognition can be enabled, whereby performance with respect to the objects can be further improved.

The invention claimed is:

1. A biped robot having at least a body, two leg linkages each swingably connected to the body through hip joints, and two arm linkages each swingably connected to the body through shoulder joints, such that said robot walks over a floor surface in an operating space by swinging the leg linkages and performs operations on objects in the operating space by driving at least the arm linkages, characterized in that:

a height from ends of the leg linkages, that contact the floor surface, to the shoulder joints, when the robot is in an upright posture is determined to be a value that falls within a range of averaged value Havg, of heights of the objects from the floor surface, ±½ a standard deviation σ of the averaged value.

2. A biped robot according to claim 1, wherein the aforesaid range is from 700 mm to 1000 mm.

3. A biped robot according to claim 1, wherein the arm linkages are composed of at least upper arms each swingably connected to the body through the shoulder joints and forearm links each swingably connected to the upper arm links through elbow joints and the length of the upper arm links is defined based on the standard deviation σ.

4. A biped robot having at least a body, two leg linkages each swingably connected to the body through hip joints, and two arm linkages each swingably connected to the body through shoulder joints and equipped with hands at said arm linkages extremities, such that said robot walks over a floor surface in an operating space by swinging the leg linkages and performs operations on objects in the operating space by driving at least the arm linkages, characterized in that:

a height from ends of the leg linkages, that contact the floor surface, when the robot is in an upright posture, is determined to be a value that falls outside a range of averaged value Havg, of heights of the objects from the floor surface, ±½ a standard deviation σ of the averaged value, when the shoulder joints assume a singularity posture.

5. A biped robot having at least a body, two leg linkages each swingably connected to the body through hip joints, two arm linkages each swingably connected to the body through shoulder joints and equipped with hands at their extremities, and a head swingably connected to the body through a neck joint and installed with a visual sensor composed of an imaging device, such that said robot walks over a floor surface in an operating space by swinging the leg linkages and performs operations on objects in the operating space by driving the arm linkages based on at least information on the operating space obtained from imagery taken by the imaging device, characterized in that:

the imaging device is installed such that optical axes connecting the hands and the imaging device make angles within a range of from 5 degrees to 45 degrees with respect to the horizontal direction when the arm linkages are positioned in a horizontal direction parallel to the floor surface when the robot in an upright posture.

6. A biped robot according to claim 5, wherein a height from ends of the leg linkages, that contact the floor surface, to the shoulder joints is determined to be within a range of from 700 mm to 1000 mm and the imaging device is installed such that a difference between the height of the shoulder joints and a height of the imaging device from the floor surface is within a range of 150 mm to 250 mm, when the robot is in an upright posture.

* * * * *

UNITED STATES PATENT AND TRADEMARK OFFICE
CERTIFICATE OF CORRECTION

PATENT NO. : 7,096,983 B2 Page 1 of 1
APPLICATION NO. : 10/416847
DATED : August 29, 2006
INVENTOR(S) : Kazuo Hirai et al.

It is certified that error appears in the above-identified patent and that said Letters Patent is hereby corrected as shown below:

In the claims, claim 1, column 13, line 19, *posture* should read *posture,*

Signed and Sealed this

Nineteenth Day of December, 2006

JON W. DUDAS
*Director of the United States Patent and Trademark Office*